US011549603B2

(12) United States Patent
Haines et al.

(10) Patent No.: US 11,549,603 B2
(45) Date of Patent: Jan. 10, 2023

(54) CHECK VALVE ASSEMBLY

(71) Applicant: PRIORITY ARTIFICIAL LIFT SERVICES, LLC, Houston, TX (US)

(72) Inventors: Paul A. Haines, Houston, TX (US); Roddy W. Simpson, Jr., Highlands, TX (US); Joseph E. Kutac, Magnolia, TX (US); Robert M. Wilkerson, Christoval, TX (US)

(73) Assignee: PRIORITY ARTIFICIAL LIFT SERVICES, LLC, Houston, TX (US)

( * ) Notice: Subject to any disclaimer, the term of this patent is extended or adjusted under 35 U.S.C. 154(b) by 246 days.

(21) Appl. No.: 16/985,439

(22) Filed: Aug. 5, 2020

(65) Prior Publication Data

US 2021/0062926 A1    Mar. 4, 2021

Related U.S. Application Data

(60) Provisional application No. 62/892,121, filed on Aug. 27, 2019.

(51) Int. Cl.
*F16K 15/06* (2006.01)
*E21B 34/10* (2006.01)
*E21B 43/12* (2006.01)

(52) U.S. Cl.
CPC ............ *F16K 15/063* (2013.01); *E21B 34/10* (2013.01); *E21B 43/123* (2013.01)

(58) Field of Classification Search
CPC ....... F16K 15/063; E21B 34/10; E21B 43/123
See application file for complete search history.

(56) References Cited

U.S. PATENT DOCUMENTS

| 2,675,021 | A | * | 4/1954 | Allin ..................... F16K 15/063 |
| | | | | 137/516.29 |
| 5,893,389 | A | * | 4/1999 | Cunningham ........ F16K 15/063 |
| | | | | 137/516.29 |
| 8,739,887 | B2 | | 6/2014 | Veit et al. |
| 9,273,541 | B2 | * | 3/2016 | Mahmoud ............... E21B 34/06 |
| 2003/0164240 | A1 | | 9/2003 | Vinegar et al. |
| 2009/0283157 | A1 | | 11/2009 | Hogan |
| 2013/0032226 | A1 | * | 2/2013 | Salihbegovic ........ E21B 43/123 |
| | | | | 137/511 |
| 2014/0034326 | A1 | | 2/2014 | Mahmoud et al. |
| 2014/0150869 | A1 | | 6/2014 | Yu et al. |
| 2015/0330183 | A1 | | 11/2015 | Sevheim et al. |

* cited by examiner

*Primary Examiner* — Abby J Flynn
*Assistant Examiner* — Yanick A Akaragwe
(74) *Attorney, Agent, or Firm* — Park, Vaughan, Fleming & Dowler LLP

(57) ABSTRACT

A check valve may include a housing having a bore therethrough, the bore including an inner surface and a bearing face; a check seat adaptor coupled to the housing; a seal in the housing, the seal including a seat bore; and a dart disposed in the bore between the seal and the bearing face and axially moveable between closed and open positions. The dart may include a tail and a head that has at least one dart inlet and sealingly engages the seal when the valve is closed. The tail defines an inner chamber having an outlet that is in fluid communication with the bore. The dart inlet(s), the inner chamber, and the outlet may be in fluid communication and together define a dart flow path through the dart. A biasing device may urge the dart toward the seal.

19 Claims, 2 Drawing Sheets

CHECK VALVE ASSEMBLY

CROSS-REFERENCE TO RELATED APPLICATIONS

This application is a non-provisional application which claims priority from U.S. provisional application No. 62/892,121, filed Aug. 27, 2019.

TECHNICAL FIELD/FIELD OF THE DISCLOSURE

The present disclosure relates generally to apparatus and methods for use in hydraulically fracturing subsurface formations.

BACKGROUND OF THE DISCLOSURE

In unconventional hydrocarbon production, the rate of production may fluctuate over both long and short time spans. For example, a well may produce at extremely high rates when initially completed and then deplete rapidly. When the natural drive energy of a reservoir is not strong enough to push oil to the surface, artificial lift may be used to lift produced fluids to the surface. While there are various ways to achieve artificial lift, gas lift is an increasingly common artificial lift choice because of its flexibility.

In gas lift wells, a compressed gas is injected into the well. The injected gas decreases the viscosity of the fluids in the well and reduces the hydrostatic pressure at the bottom of the well by displacing some of the well fluids, which allows the produced fluids to flow more easily to the surface and allows reservoir fluids to enter the well at a higher flow rate. In some cases, the gas to be injected into the production tubing is conveyed downhole via the annular space surrounding the production tubing and enters the production tubing through one or more gas lift valves. Each gas lift valve may include a check valve to selectively allow a fluid flow from the inlet side of the check valve to the outlet side of the check valve and prevent reverse flow from the tubing to the annulus.

By way of example, FIG. 1 schematically depicts a gas lift system 10 that includes a production tubing 14 that extends into a wellbore. An annulus is defined between the production tubing and the wellbore, which may or may not be cased. The production tubing 14 has a central passageway 17. The system may include a gas compressor 12 located on the surface. The compressor provides pressurized gas to the annulus 15. To control the communication of gas between the annulus 15 and the central passageway 17 of the production tubing 14, the system may include several side pocket gas lift mandrels 16, as shown at 16a, 16b and 16c. Each of the gas lift mandrels 16 may include an associated gas lift valve 18, as shown in phantom at 18a, 18b and 18c. The gas lift valves 18 each establish a one-way fluid flow path from the annulus 15 to the central passageway 17.

As wells age and it becomes desirable to using more aggressive gas lift techniques, check valves are subjected to greater fluid flow rates and more rapid cycling rates, both of which may reduce the lifespan and/or efficacy of a check valve.

SUMMARY

A check valve may comprise a check housing having a housing bore therethrough, the housing bore including an inner surface and defining a housing bearing face; a check seat adaptor mechanically coupled to the check housing and including a check seal in the housing bore, the check seal including a seat bore; and a check dart disposed in the housing bore between the check seal and the housing bearing face and axially moveable therein between a closed position and an open position. The check dart may include a head portion having a largest head diameter, the head portion configured to sealingly engage the check seal when the check dart is in the closed position, the head portion including at least one dart inlet, a tail portion having an outside dart diameter that is smaller than the largest head diameter, the tail portion defining an inner chamber having a chamber outlet that is in fluid communication with the housing bore, and a biasing shoulder between the head portion and the tail portion, wherein the shoulder is oriented away from the check seal. The dart inlet(s), the inner chamber, and the chamber outlet may be in fluid communication and may together define a dart flow path through the check dart. The check valve may also include a biasing device compressed between the biasing shoulder and the housing bearing face so as to urge the check dart toward the check seal.

The biasing device may not be in the dart flow path. An annular space may be defined between the tail portion and the housing and the biasing means may be disposed in the annular space. The tail portion may include at least one port that provides fluid communication between the inner chamber and the annular space.

The housing bore may include a box section, a valve section, a landing section, and an outlet section. A portion of the tail portion may be slidably received in the landing section. The housing bearing face may extend radially between the valve section and the landing section and a landing face may extend radially between the landing section and the outlet section. The tail portion of the dart may seat on the landing face when the check dart is in a fully open position. The housing bore may further include a retainer lip extending radially between the box section and the valve section.

The head portion of the dart may include at least two or more dart inlets. In some embodiments, the head portion of the dart may include five circumferentially-spaced dart inlets. At least one dart inlet may include a radial component.

The outlet of the inner chamber may be aligned with the housing bore. The dart(s) may have a cross-sectional area. A cross-sectional area of the dart flow path may include the sum of the dart inlet cross-sectional areas. The smallest cross-sectional area of the dart flow path may be greater than the cross-sectional area of the seat bore. The dart(s) may have a minimum cross-sectional area and the sum of the dart inlet minimum cross-sectional areas may be equal to or greater than the cross-sectional area of the inner chamber.

The smallest cross-sectional area of the inner chamber may be equal to or greater than the largest cross-sectional area of the seat bore. The dart flow path may include no portion having a center line that forms an angle greater than 60 degrees with respect to the axis of the check valve.

BRIEF DESCRIPTION OF THE DRAWINGS

The present disclosure is best understood from the following detailed description when read with the accompanying figures. It is emphasized that, in accordance with the standard practice in the industry, various features are not

DETAILED DESCRIPTION

Figure 1:
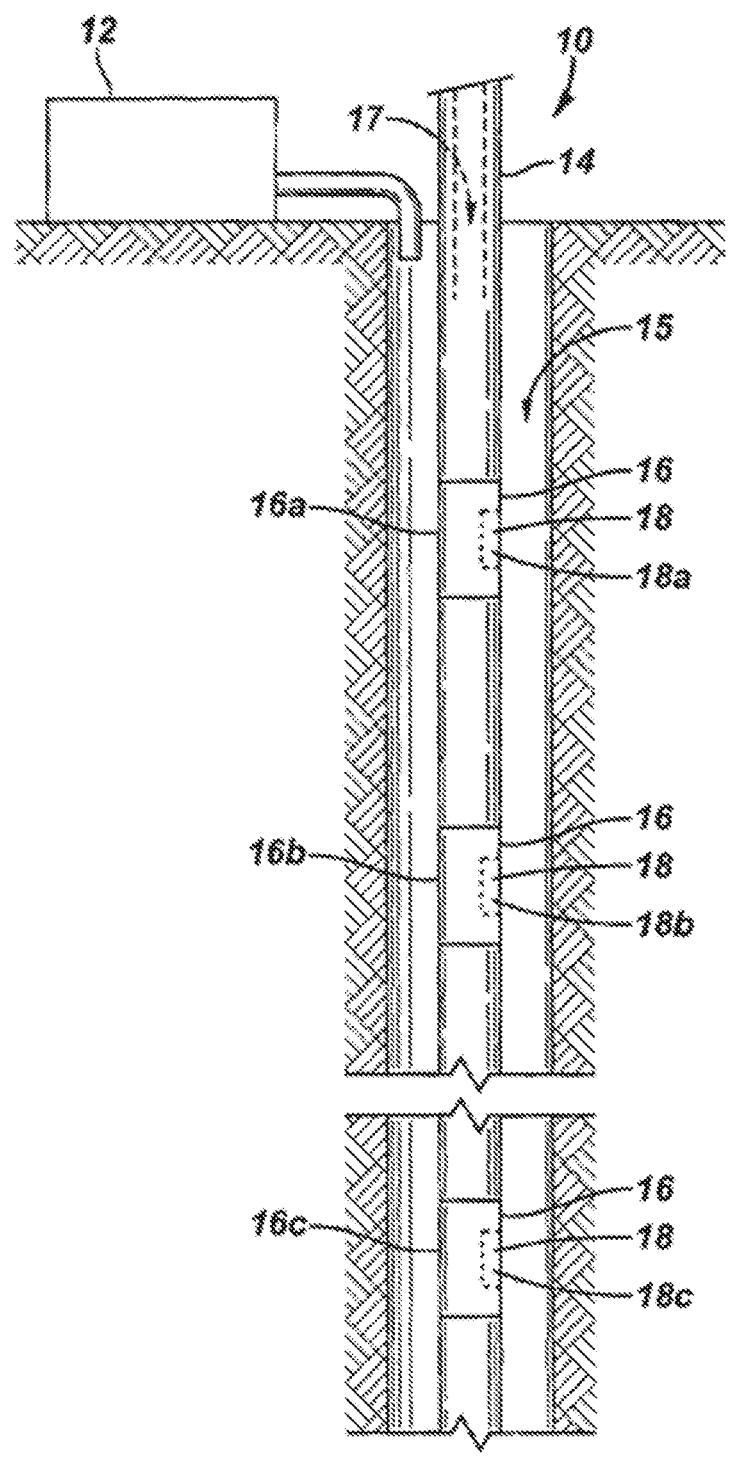
FIG. 1 is a schematic diagram of a gas lift system in a well.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Further, in the description that follows, because the device is a check valve adapted to allow fluid flow in only one direction, and for the sake of clarity, the terms "upstream" and "downstream" will be used to refer to positions relative to the intended direction of fluid flow, which is generally to the right as drawn.

Figure 2:
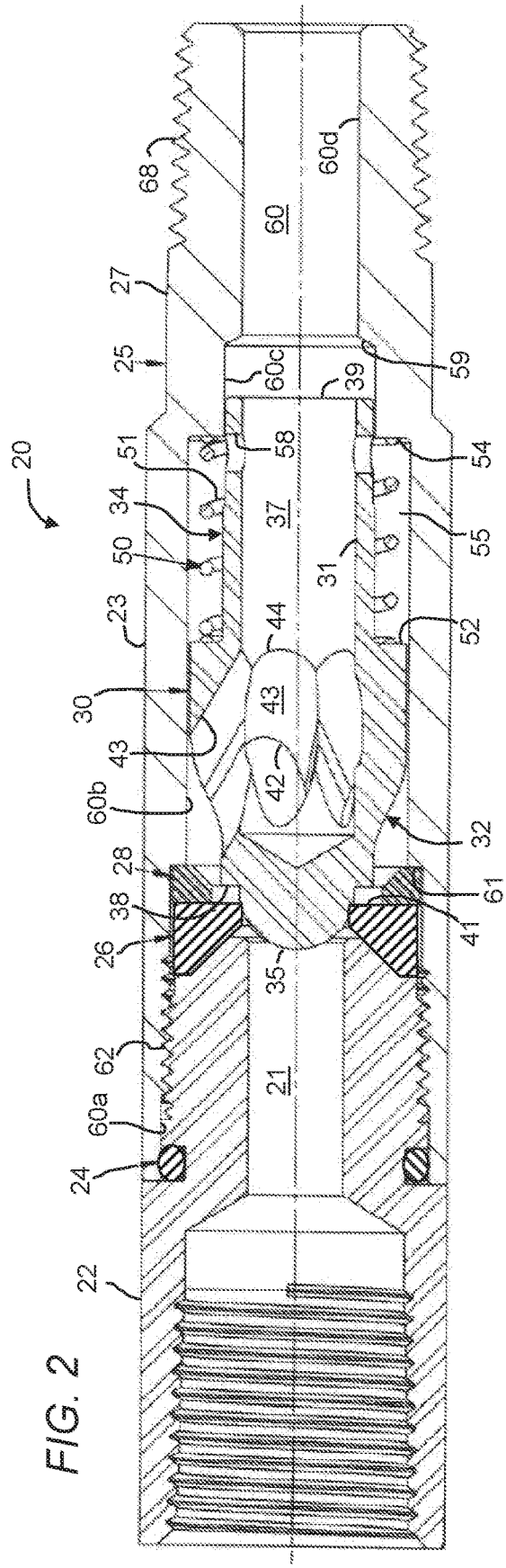
FIG. 2 is a schematic cross-section showing a check valve in accordance with one embodiment of the present disclosure.

Referring to FIG. 2, an embodiment of a check valve 20 may include check seat adaptor 22, check housing 25, moveable check dart 30, and biasing device 50 that urges the check dart 30 into a closed position. Check seat adaptor 22 may include an adaptor body having a longitudinal seat bore 21 therethrough. Check housing 25 may include box 23 and pin 27 and may include a longitudinal stepped bore 60. Pin 27 may include an engagement portion such as, for example, threads 68, for engaging an adjacent tubular.

Stepped bore 60 of check housing 25 may include a box section 60a, valve section 60b, landing section 60c, and outlet section 60d. Of sections 60a-d, box section 60a has the largest diameter. Valve section 60b is defined by an inside wall of box 23. Outlet section 60d is defined by an inside wall of pin 27 and has a diameter that is less than the diameter of valve section 60b. Landing section 60c is between valve section 60b and outlet section 60d and may be located in pin 27 (as shown), or in box 23. Landing section 60c may have a diameter that is less than the diameter of valve section 60b and greater than the diameter of outlet section 60d.

Box section 60a may include a means for mechanically engaging check seat adaptor 22 such as, for example, threads 62. Check housing 25 may include retainer lip 61 defined between box section 60a and valve section 60b, spring seat 54 defined between valve section 60b and landing section 60c, and dart seat 59 defined between landing section 60c and outlet section 60d.

Seal 24, such as an O-ring seal, may be disposed between check seat adaptor 22 and box section 60a. Check seal 26 and check seal retainer 28 may be retained between check seat adaptor 22 and retainer lip 61. Check seal 26 may be annular and may define a sealing surface 41 having an opening therethrough. The opening in check seal 26 may be at least as large as the seat bore 21. To facilitate sealing, check seal 26 and check seal retainer 28 may each include an elastomeric material or any other desired material.

Figure 3:
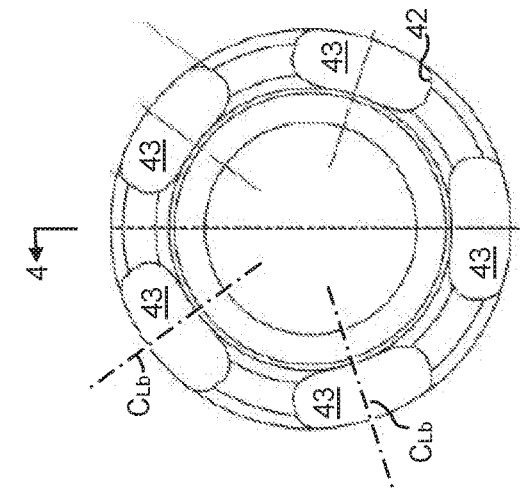
FIG. 3 is an end view of a check dart in accordance with one embodiment of the present disclosure.

Referring now to FIGS. 1-3, check dart 30 may include head portion 32 and tail portion 34. Head portion 32 and tail portion 34 may or may not be integrally formed. Head portion 32 includes a nose 35. Nose 35 may be configured to guide check dart 30 as check dart moves into sealing engagement with check seal 26 (to the left as drawn). In certain non-limiting embodiments, nose 35 may be conical or hemispherical. Adjacent to nose 35 is sealing shoulder 38. Sealing shoulder 38 has a diameter greater than that of nose 35 and is configured to bear on and form a seal with sealing surface 41 of check seal 26. The diameter of head portion 32 increases from sealing shoulder 38 to a head diameter Dh that is nearly as great as the diameter of valve section 60b but sufficiently smaller to allow reciprocating movement of check dart 30 within check housing 25.

Figure 4:
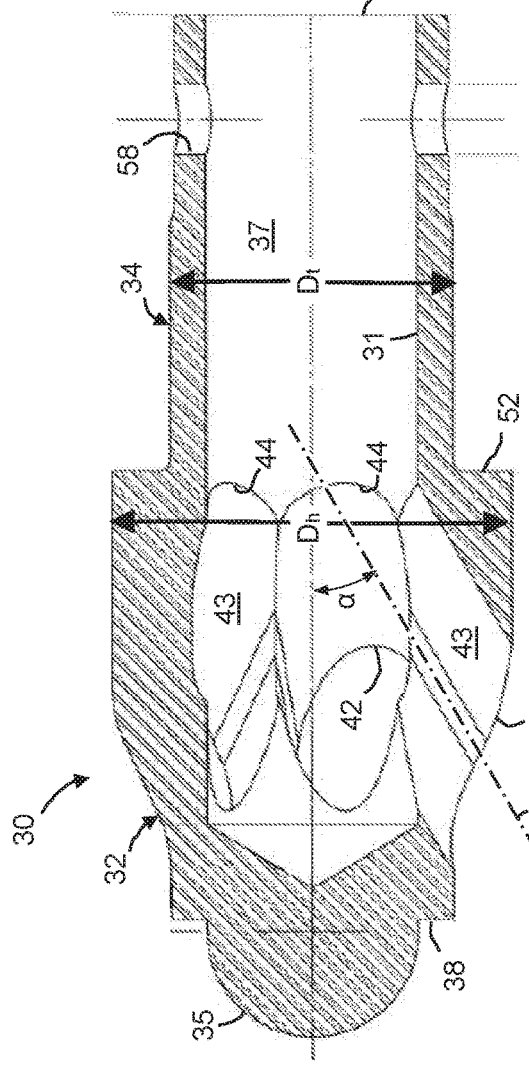
FIG. 4 is cross-section taken along lines 4-4 of FIG. 3.

Tail portion 34 of check dart 30 may be tubular and may have an outside diameter Dt that is smaller than Dh (FIG. 4). The interface between head portion 32 and tail portion 34 defines biasing shoulder 52 that is oriented away from check seal 26. Annular space 55 (FIG. 2) is defined between the outside of tail portion 34 and the inside surface of valve section 60b. Tail portion 34 includes annular wall 31 that defines inner chamber 37. The smallest cross-sectional area of inner chamber 37 may be equal to or greater than the largest cross-sectional area of seat bore 21. Inner chamber 37 includes outlet 39 that opens into stepped bore 60 of check housing 25. Annular wall 31 may include one or more ports 58 therethrough that allow fluid communication between inner chamber 37 and annular space 55.

Head portion 32 of check dart 30 may include one or more dart inlets 43 and may include two or more dart inlets 43. Each dart inlet 43 provides a fluid flow path from the outside of head portion 32 to inner chamber 37. Each dart inlet 43 may have inlet opening 42 and outlet opening 44. In the illustrated embodiment, there are five dart inlets 43; in some embodiments, there may be more or fewer dart inlets 43. By way of example only and not limitation, the number of dart inlets 43 may be any number from one to twenty. In embodiments where there is more than one dart inlet 43, the dart inlets may be evenly spaced about the circumference of head portion 32 and may be positioned in two or more longitudinally-spaced rows. Dart inlet openings 42 may be positioned downstream of sealing shoulder 38 so as to avoid interfering with the sealing function of check dart 30.

In some embodiments, each dart inlet 43 may comprise a bore having centerline $C_{Lb}$. Because at least a portion of each inlet opening 42 may be at a greater radius from the tool axis than radius of inner chamber 37, the direction of each dart inlet centerline may have a radial component. Thus, in longitudinal cross-section (FIGS. 2 and 4), each $C_{Lb}$ may define an angle α between 20 and 80 degrees with the longitudinal axis of check dart 30. In some embodiments, α may be between 30 and 50 degrees. In some embodiments and as best seen in FIG. 3, each dart inlet 43 may have a non-circular cross-section; in the illustrated embodiment, the circumferential extent of each dart inlet bore is greater than its radial extent. In the illustrated embodiment, each dart inlet 43 is shown as substantially straight but in other embodiments, dart inlets 43 could be configured differently.

In some embodiments, the components of check valve 20 are configured so that the pressure drop across the valve when the valve is in its open position is minimized. Thus, in some embodiments, each dart inlet has a minimum cross-sectional area (measured normal to the direction of flow) and the sum of the dart inlets' minimum cross-sectional areas at any point along check valve 20 may be equal to or greater than the cross-sectional area of seat bore 21. In some embodiments, the cross-sectional area of inner chamber 37 may be equal to or greater than the cross-sectional area of seat bore 21. In some embodiments, the sum of the dart inlets' minimum cross-sectional areas may be equal to or greater than the cross-sectional area of inner chamber 37. Likewise, the fluid flow path(s) through the valve may be configured to avoid one or more of: obstructions, changes in flow direction, edges, corners, and other features that may increase turbulence.

The downstream end of tail portion 34 may be sized to be slidably received in landing section 60c of check housing 25. In some embodiments, the disposition of tail portion 34 in landing section 60c helps maintain check dart 30 in coaxial alignment with check housing 25 as check dart 30 moves within check housing 25. Tail portion 34 and landing section 60c may be configured such that dart seat 59 limits movement of check dart 30 in the downstream direction. In some embodiments, check dart 30 may seat on dart seat 59 when check valve 20 is fully open. Ports 58 are provided to allow fluid equilibration between inner chamber 37 and annular space 55 but annular space 55 is not part of the primary fluid flow path through check valve 20.

In some embodiments, including the embodiment illustrated in FIG. 2, tail portion 34 and landing section 60c may be configured such that ports 58 are blocked by check housing 25 when check dart 30 is seated on dart seat 59 and are not blocked when check dart 30 engages check seal 26. In instances in which ports 58 can be blocked, fluid equilibrium between inner chamber 37 and annular space 55 may be hindered, which may produce a delaying or damping effect on operation of check valve 20. In some instances, a delaying or damping effect could be advantageous in reducing or preventing "chattering" of the dart, i.e. where the dart cycles between open and closed relatively rapidly. Chattering may increase wear, shorten the lifespan, and reduce the efficacy of check valve 20.

In other embodiments, tail portion 34 and landing section 60c may be configured such that ports 58 are not blocked when check dart 30 is seated on dart seat 59 or when check dart 30 engages check seal 26.

As illustrated, in some embodiments, biasing device 50 may be coil spring 51 positioned in annular space 55, with an upstream end of spring 51 configured to bear on biasing shoulder 52 and a downstream end of spring 51 configured to bear on spring seat 54. Biasing device 50 may be a coil spring, as shown, or may be any other suitable mechanism for applying a biasing force to check dart 30, including but not limited to: other spring configurations, hydraulic or pneumatic devices, elastomeric members in compression or tension, or the like. In some embodiments, biasing device 50 may be partially compressed when check valve 20 is closed and further compressed when check valve 20 is open so that biasing device 50 applies a biasing force that urges check dart 30 in the upstream direction regardless of the position of check dart 30 within check valve 20. In these embodiments, the length of biasing device 50 may be somewhat greater than the maximum longitudinal distance between biasing shoulder 52 and spring seat 54, i.e. measured when check valve 20 is closed and check dart 30 is in sealing engagement with check seal 26.

In some embodiments, biasing device 50 may be configured such that maximal compression of biasing device 50, i.e. when check valve 20 is fully open, does not cause plastic deformation of biasing device 50. Likewise, nose 35 may be configured such that when the tubing pressure or flow rate falls below a certain level and check valve 20 is fully closed, nose 35 engages check seat adaptor 22. The metal-to-metal engagement of nose 35 with check seat adaptor 22 may provide some additional sealing capability and may serve to prevent check seal 26 from being crushed and destroyed. The engagement of nose 35 with check seat adaptor 22 may provide a "positive stop" that may extend the life of check seal 26.

As described above, in the absence of elevated fluid pressure in seat bore 21, check valve 20 may be normally closed. In operation, when there is sufficient fluid pressure in seat bore 21 to overcome the biasing force of biasing device 50, check dart 30 will shift in the downstream direction, thereby allowing fluid to pass between nose 35 and check seal 26. Fluid flowing past nose 35 will flow through dart inlet(s) 43 into inner chamber 37, out of inner chamber 37 via outlet 39, and into outlet section 60d of bore 60.

Because the fluid flow path through check valve 20 passes through the interior of check dart 30, whereas biasing device 50 is in annular space 55, biasing device 50 is not generally exposed to the fluid flow when check valve 20 is open. As a flowing fluid may erode equipment with which it comes in contact, removing biasing device 50 from the fluid flow path may extend the life of biasing device 50. In addition, because fluid flowing though check valve 20 need not flow through or along biasing device 50, the fluid flow path may be less turbulent, and may result in a smaller pressure drop across check valve 20. Annular space 55 is not part of the primary fluid flow path through check valve 20.

In an exemplary application, if check valve 20 is installed as a gas lift valve 18 as illustrated in FIG. 1, check valve 20 may be installed when no lift gas is being delivered. In some embodiments, check valve 20 is normally closed and the production tubing pressure in acting on the back (downstream) side of check valve 20 may be greater than the annulus or casing pressure acting on the front (upstream) side. By contrast, when compressed gas is pumped into the annulus 15, the annulus or casing pressure may increase relative to the production tubing pressure. The increased annulus pressure will exert a force on the front side of check valve 20. If sufficient, the increased annulus pressure will overcome the force applied by biasing device 50 and check dart 30 will retract from check seat adaptor 22 and check seal 26 as biasing device 50 is compressed, thereby opening check valve 20. The opening of check valve 20 permits gas to flow from the annulus through the gas lift valve 18 and into the production tubing 14.

In some embodiments, biasing device 50 may be omitted from check valve 20. In such embodiments, sometimes referred to as upside-down installations, the check valve may be installed such that that the force of gravity tends to urge check dart 30 onto dart seat 59. Regardless of the orientation of check valve 20 (right-side-up or upside-down), biasing device 50 may not be needed if fluid velocity is sufficient.

As the pressure drop across a valve is a function of the conditions in which it is operated, including for example, fluid velocity, fluid viscosity, and pressures upstream and downstream of the valve, the pressure drop across check valve 20 will depend on its operating conditions The check valves disclosed herein may be advantageously deployed in one or more side pocket gas lift mandrels. In other embodiments, the check valves disclosed herein may be used to limit the direction of flow of other fluids.

By way of example only, check valve 20 may be included in a gas lift apparatus positioned between the well annulus and the inside of a production tubing in a hydrocarbonproducing well. In some embodiments, the gas lift apparatus would include a gas lift valve that includes a check valve 20. Check valve 20 would selectively allow fluid flow from an inlet side of the check valve to an outlet side of the check valve when open and may be biased to prevent leakage from the outlet side to the inlet side of the check valve when closed.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure and that they may make various changes, substitutions, and alterations herein without departing from the spirit and scope of the present disclosure.

The invention claimed is:

1. A check valve, comprising:
    a check housing having a housing bore therethrough, the housing bore including an inner surface and defining a housing bearing face;
    a check seat adaptor mechanically coupled to the check housing and including a check seal in the housing bore, the check seat adaptor including a seat bore; and
    a check dart disposed in the housing bore between the check seal and the housing bearing face, wherein the check dart is moveable between a closed position in which fluid flow through the check valve is prevented and an open position in which the seat bore and the housing bore are in fluid communication, the check dart including:
    a head portion having a largest head diameter, the head portion configured to sealingly engage the check seal when the check dart is in the closed position, the head portion including at least one dart inlet extending therethrough; and
    a tail portion having an outside diameter that is smaller than the largest head diameter, wherein the tail portion defines an inner chamber having a chamber outlet that is in fluid communication with the housing bore, and wherein an annular space is defined between the tail portion and the check housing wherein the tail portion includes at least one port that provides fluid communication between the inner chamber and the annular space;
    wherein the at least one dart inlet, the inner chamber, and the chamber outlet are in fluid communication and define a dart flow path through the check dart.

2. The check valve of claim 1, further including a biasing shoulder between the head portion and the tail portion, wherein the biasing shoulder is oriented away from the check seal, and further including a biasing device extending between the biasing shoulder and the housing bearing face, the biasing device being configured to urge the check dart toward the check seal.

3. The check valve of claim 2 wherein the biasing device is not in the dart flow path.

4. The check valve of claim 2 wherein the biasing device is disposed in the annular space.

5. The check valve of claim 1 wherein the ports are blocked when the check dart is in the open position.

6. The check valve of claim 1 wherein the housing bore includes a box section, a valve section, a landing section, and an outlet section.

7. The check valve of claim 6 wherein a portion of the tail portion is slidably received in the landing section.

8. The check valve of claim 6 wherein the housing bearing face extends radially between the valve section and the landing section and wherein a landing face extends radially between the landing section and the outlet section.

9. The check valve of claim 8 wherein the tail portion seats on the landing face when the check dart is in the open position.

10. The check valve of claim 6 wherein the inside diameter of the box section is greater than the inside diameter of the valve section, whereby a radially extending retainer lip is defined between the box section and the valve section.

11. The check valve of claim 1 wherein the head portion includes at least two dart inlets.

12. The check valve of claim 1 wherein the head portion includes five circumferentially-spaced dart inlets.

13. The check valve of claim 1 wherein the at least one dart inlet is configured such that the centerline of the dart inlet defines an angle α between 20 and 80 degrees with the longitudinal axis of the check dart.

14. The check valve of claim 1 wherein the chamber outlet is aligned with the housing bore.

15. The check valve of claim 14 wherein the at least one dart inlet has a minimum cross-sectional area, wherein the sum of the dart inlet minimum cross-sectional areas is equal to or greater than the cross-sectional area of the inner chamber.

16. The check valve of claim 1 wherein the at least one dart inlet has a cross-sectional area, wherein a cross-sectional area of the dart flow path equals the sum of the dart inlet cross-sectional areas, and wherein the smallest cross-sectional area of the dart flow path is greater than the cross-sectional area of the seat bore.

17. The check valve of claim 16 wherein the smallest cross-sectional area of the inner chamber is equal to or greater than the largest cross-sectional area of the seat bore.

18. The check valve of claim 1 wherein the dart flow path includes no portion having a center line that forms an angle greater than 60 degrees with respect to the longitudinal axis of the check valve.

19. A check valve, comprising:
    a check housing having a housing bore therethrough, the housing bore including an inner surface and defining a housing bearing face;
    a check seat adaptor mechanically coupled to the check housing and including a check seal in the housing bore, the check seat adaptor including a seat bore;
    a check dart disposed in the housing bore between the check seal and the housing bearing face, wherein the check dart is moveable between a closed position in which fluid flow through the check valve is prevented and an open position in which the seat bore and the housing bore are in fluid communication, the check dart including:
    a head portion having a largest head diameter, the head portion configured to sealingly engage the check seal when the check dart is in the closed position, the head portion including at least one dart inlet extending therethrough; and
    a tail portion having an outside diameter that is smaller than the largest head diameter, wherein the tail portion defines an inner chamber having a chamber outlet that is in fluid communication with the housing bore, wherein a biasing shoulder is defined between the head portion and the tail portion, wherein the tail portion includes at least one port that provides fluid communication between the inner chamber and an annular space, wherein the annular space is defined between the tail portion and the check housing, wherein the tail portion includes at least one port that provides fluid communication between the inner chamber and the annular space, and wherein the at least one port is blocked when the check dart is in the open position;

wherein at least one dart inlet is configured such that the centerline of the at least one dart inlet defines an angle $\alpha$ between 20 and 80 degrees with the longitudinal axis of the check dart;

wherein the at least one dart inlet, the inner chamber, and the chamber outlet are in fluid communication and together define a dart flow path through the check dart; and a biasing device positioned in the annular space extends between the biasing shoulder and the housing bearing face, wherein the biasing device is configured to urge the check dart toward the check seal.

\* \* \* \* \*